(12) United States Patent
Nam et al.

(10) Patent No.: US 10,158,123 B2
(45) Date of Patent: Dec. 18, 2018

(54) SECONDARY BATTERY

(71) Applicant: SAMSUNG SDI CO., LTD., Yongin-si, Gyeonggi-do (KR)

(72) Inventors: Jong-Woo Nam, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 338 days.

(21) Appl. No.: 14/640,556

(22) Filed: Mar. 6, 2015

(65) Prior Publication Data

US 2015/0340701 A1  Nov. 26, 2015

(30) Foreign Application Priority Data

May 22, 2014 (KR) ........................ 10-2014-0061799

(51) Int. Cl.
| | |
|---|---|
| *H01M 2/22* | (2006.01) |
| *H01M 2/24* | (2006.01) |
| *H01M 2/26* | (2006.01) |
| *H01M 4/64* | (2006.01) |
| *H01M 4/70* | (2006.01) |
| *H01M 4/78* | (2006.01) |
| *H01M 10/647* | (2014.01) |
| *H01M 2/30* | (2006.01) |
| *H01M 2/34* | (2006.01) |

(Continued)

(52) U.S. Cl.
CPC ............. *H01M 4/70* (2013.01); *H01M 2/26* (2013.01); *H01M 2/30* (2013.01); *H01M 2/347* (2013.01); *H01M 2/0217* (2013.01); *H01M 2/04* (2013.01)

(58) Field of Classification Search
None
See application file for complete search history.

(56) References Cited

U.S. PATENT DOCUMENTS 5,158,842 A 10/1992 McHenry
7,079,670 B2 7/2006 Pan et al.
(Continued)

FOREIGN PATENT DOCUMENTS

CN 102738428 A 10/2012
CN 103137996 A 6/2013
(Continued)

OTHER PUBLICATIONS

English translation of JP 2002/279962 (2002).*
(Continued)

*Primary Examiner* — Yoshitoshi Takeuchi
(74) *Attorney, Agent, or Firm* — Lewis Roca Rothgerber Christie LLP

(57) ABSTRACT

A secondary battery includes a case; an electrode assembly accommodated in the case, and including a first electrode plate, a second electrode plate, and a separator between the first and second electrode plates; a first terminal portion electrically connected to the electrode assembly; and a cap plate configured to cover an opening of the case, and the first terminal portion includes a first electrode terminal passing through the cap plate to protrude upward from a first position of the cap plate, and a first current collector including a first end connected to the first electrode terminal, and a second end connected to the first electrode plate, the first current collector including a plurality of notches.

12 Claims, 3 Drawing Sheets

(51) Int. Cl.
*H01M 2/04* (2006.01)
*H01M 2/02* (2006.01)

(56) References Cited

U.S. PATENT DOCUMENTS

| | | |
|---|---|---|
| 8,722,237 B2 | 5/2014 | Guen |
| 9,159,984 B2 | 10/2015 | Guen |
| 2007/0196729 A1 | 8/2007 | Yamauchi et al. |
| 2011/0020694 A1 | 6/2011 | Khakhalev et al. |
| 2013/0136960 A1* | 5/2013 | Guen .................... H01M 2/348 429/61 |
| 2013/0252053 A1 | 9/2013 | Woo |

FOREIGN PATENT DOCUMENTS

| | | | |
|---|---|---|---|
| EP | 2 597 705 A1 | 5/2013 | |
| JP | 2002-246007 | 8/2002 | |
| JP | 2002/279962 | * 9/2002 | ............. H01M 2/26 |
| JP | 2002-279962 | 9/2002 | |
| JP | 2002-279962 A | 9/2002 | |
| JP | 2002279962 | * 9/2002 | ............. H01M 2/26 |
| KR | 10-2007-0083415 A | 8/2007 | |
| KR | 10-2013-0106672 A | 9/2013 | |

OTHER PUBLICATIONS

EPO Search Report dated Sep. 10, 2015, for corresponding European Patent application 15168366.1, (10 pages).
EPO Office Action dated Jan. 18, 2017, for corresponding European Patent Application No. 15168366.1 (7 pages).
EPO Office Action dated Jun. 2, 2017, for corresponding European Patent Application No. 15168366.1 (7 pages).
SIPO Office Action dated Aug. 28, 2018 with English translation of the corresponding Chinese Patent Application No. 201510219884.4, noting listed references in this IDS (15 pages).

* cited by examiner

SECONDARY BATTERY

CROSS-REFERENCE TO RELATED APPLICATION

This application claims priority to and the benefit of Korean Patent Application No 10-2014-0061799, filed on May 22, 2014 in the Korean Intellectual Property Office, the entire content of which is incorporated herein by reference.

BACKGROUND

1. Field

Aspects of embodiments of the present invention relate to secondary battery.

2. Description of the Related Art

A secondary battery may be repeatedly charged or discharged, unlike a primary battery that is a non-rechargeable battery.

A low-capacity secondary battery may be used for a portable and small electronic device, such as a mobile phone, a notebook computer, or a camcorder, whereas a high-capacity secondary battery may be used as a power source for driving a motor, such as that of a hybrid vehicle, an electric vehicle, or the like.

The secondary battery includes an electrode assembly having a separator and an anode and a cathode provided on opposite sides of the separator a case accommodating the electrode assembly therein, a cap plate closing an opening of the case, and an electrode terminal provided to pass through the cap plate and electrically connected to the electrode assembly.

Such a secondary battery requires safety and reliability, even in severe environments.

SUMMARY

According to an aspect of embodiments of the present invention, a secondary battery is capable of ensuring safety and reliability from external shocks.

Other aspects and features of embodiments of the present invention will be understood by those skilled in the art upon reading the following description.

According to one or more embodiments of the present invention, a secondary battery includes: a case; an electrode assembly accommodated in the case, and including a first electrode plate, a second electrode plate, and a separator between the first and second electrode plates; a first terminal portion electrically connected to the electrode assembly; and a cap plate configured to cover an opening of the case, and the first terminal portion includes a first electrode terminal passing through the cap plate to protrude upward from a first position of the cap plate, and a first current collector including a first end connected to the first electrode terminal, and a second end connected to the first electrode plate, the first current collector including a plurality of notches.

The first current collector may include: a first plate connected to the first electrode terminal, and arranged parallel to the cap plate; and a second plate connected to the first electrode plate, and extending away from the first plate it a vertical direction.

A wide surface of the second plate may be in contact with a non-coating portion of the first electrode plate and arranged parallel to the non-coating portion, and may be connected to the first electrode plate.

The plurality of notches may be in the pride surface of the second plate in a widthwise direction thereof.

Notches of the plurality of notches may be at intervals along a first edge of the wide surface of the second plate.

The first edge of the second plate having the plurality of notches may be nearer to a center of the electrode assembly as compared to a second edge of the second plate.

Each of the plurality of notches may have a shape selected from the group consisting of a rectangular shape, a triangular shape, and an elliptical shape.

The secondary battery may further include a second terminal portion including: a second electrode terminal passing through the cap plate to protrude upward from a second position of the cap plate; and a second current collector including a first end connected to the second electrode terminal, and a second end connected to the second electrode plate, the second current collector including a plurality of notches.

The plurality of notches of the first current collector and the plurality of notches of the second current collector may be arranged symmetrically with respect to a center of the electrode assembly.

According to an aspect of embodiments of the present invention, a secondary battery may ensure or improve safety and reliability from external shocks.

BRIEF DESCRIPTION OF THE DRAWINGS

Some example embodiments of the present invention are described more fully hereinafter with reference to the accompanying drawings; however, the present invention may be embodied in different forms and should not be construed as limited the embodiments set forth herein. Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

FIG. 5 is a perspective view of the secondary battery or FIG. 1, show with a case and a cap plate removed from the secondary battery.

DETAILED DESCRIPTION the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

A secondary battery according to an exemplary embodiment of the present invention is described in further detail below with reference to the accompanying drawings.

Figure 1:
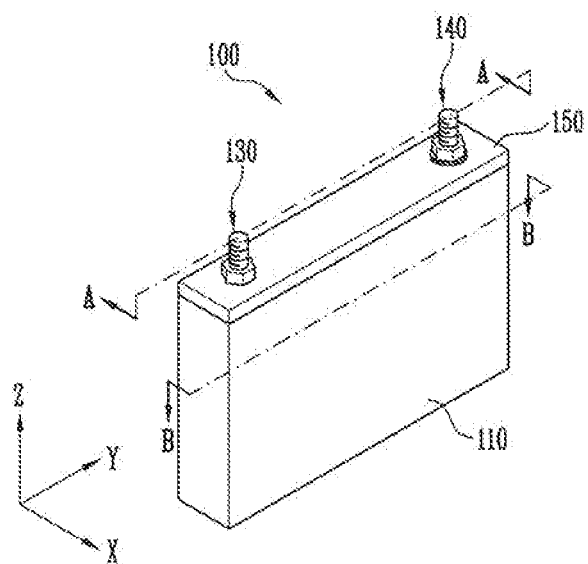
FIG. 1 is a perspective view of a secondary battery according to an embodiment of the present invention.

FIG. 1 is a perspective view of a secondary battery 100 according to an embodiment of the present invention.

Figure 2:
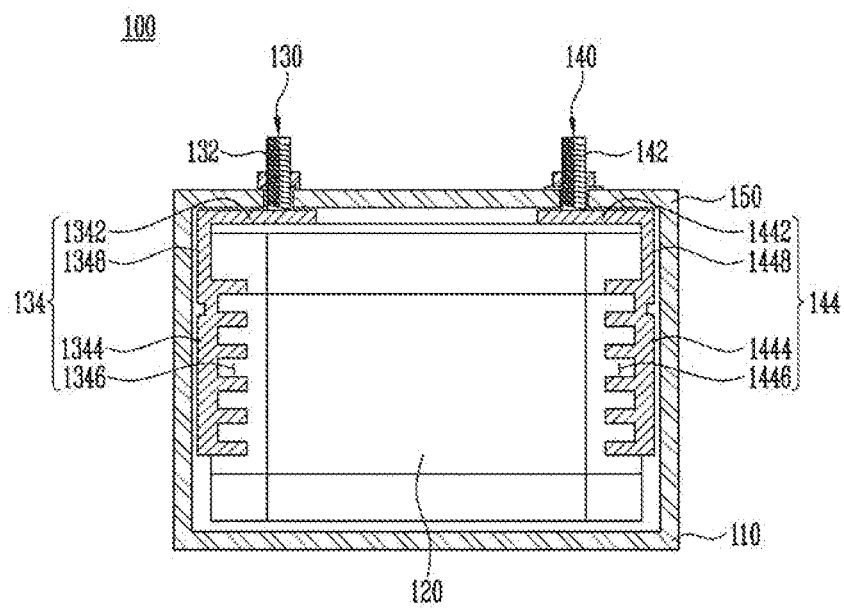
FIG. 2 is a sectional view of the secondary battery of FIG. 1, taken along the line A-A.
Figure 3:
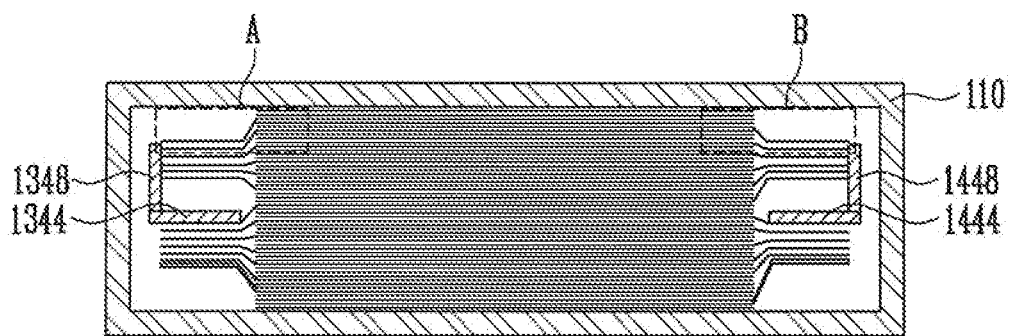
FIG. 3 is a sectional view of the secondary battery of FIG. 1, taken along the line B-B.

FIG. 2 is a sectional view of the secondary battery 100, taken along the line A-A of FIG. 1; and FIG. 3 is a sectional view of the secondary battery 100, taken along the line B-B of FIG. 1.

Figure 4A:
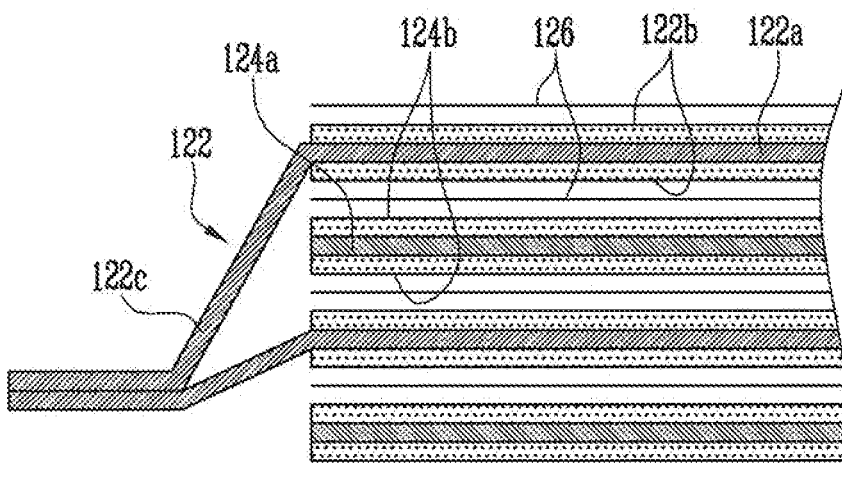
FIG. 4A is enlarged view illustrating a region "A" of FIG. 3.
Figure 4B:
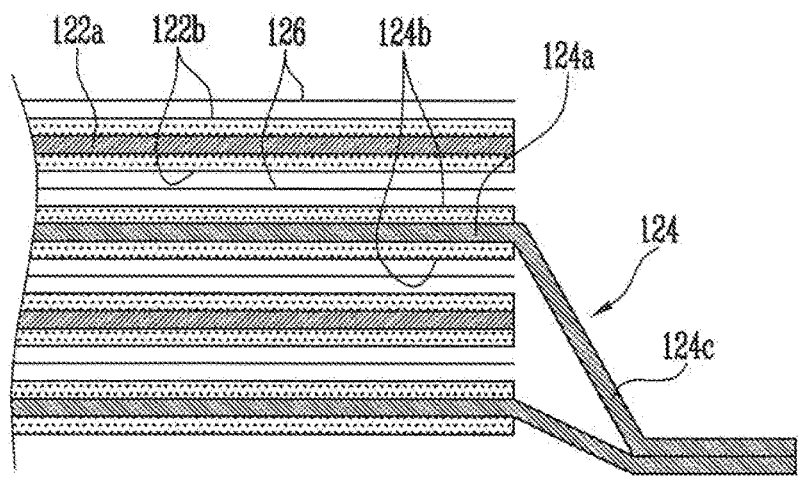
FIG. 4B is an enlarged view illustrating a region "B" of FIG. 3.

FIG. 4A is an enlarged view illustrating a region "A" of FIG. 3 and FIG. 4B is an enlarged view illustrating a region "B" of FIG. 3.

Figure 5:
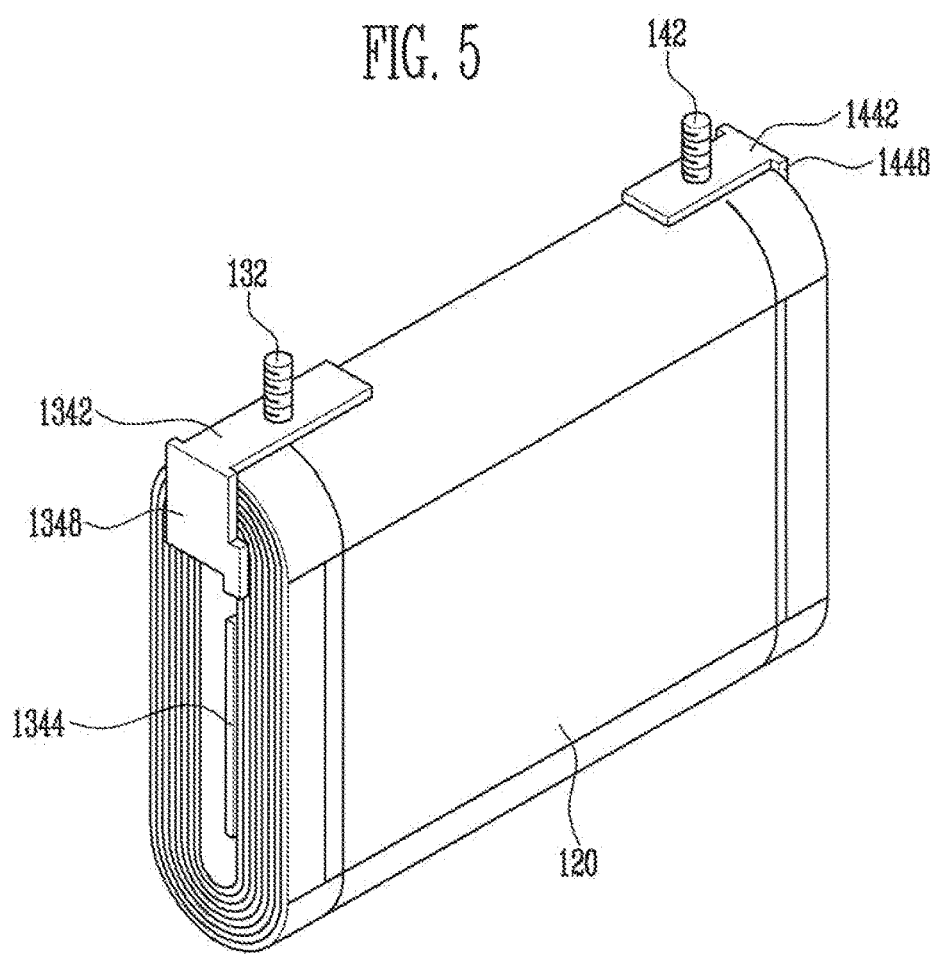

Further, FIG. 5 is a perspective view of the secondary battery 100 in which a case 110 and a cap plate 150 are removed from the secondary battery 100.

As shown in FIGS. 1 to 5, the secondary battery 100 according to an embodiment of the present invention includes the case 110, an electrode assembly 120, a first terminal portion 130, a second terminal portion 140, and the cap plate 150.

First, the case 110 and the cap plate 150 will be described. The case 110 in one embodiment, has a generally box shape to define a space for accommodating the electrode assembly 120 and an electrolyte (not shown) therein.

The case 110 may be made of aluminum, copper, iron, or stainless steel, for example.

An opening is formed in a top of the case 110 such that an inner space of the case 110 is open to the outside. The opening allows the electrode assembly 120 that will be described further below to be inserted into the case 110.

The cap plate 150 is provided around the opening of the case 110 to close the opening of the case 110.

The cap plate 150 may be made of a thin sheet, such as a thin steel sheet. Although not shown in the drawings, an electrolyte inlet port and a vent hole may be formed in the cap plate 150. The electrolyte inlet port (not shown) allows the electrolyte to be injected into the case 110 after the cap plate 150 is coupled to the case 110. The vent hole (not shown) serves to discharge internal gas to prevent or substantially prevent the internal pressure of the secondary battery 100 from exceeding a preset level.

The electrode assembly 120 according to an embodiment of the present invention charges or discharges a current, and may be formed by placing a first electrode plate 122 and a second electrode plate 124 on opposite sides of a separator 126 that is an insulator, and then winding the first electrode plate 122, the second electrode plate 124, and the separator 126 in a jelly roll form.

The first electrode plate 122 and the second electrode plate 124 may function as an anode and a cathode, respectively. For clarity of description, it is assumed that the first electrode plate 122 is the anode and the second electrode plate 124 is the cathode, although the present invention is not limited thereto. Further, although the electrode assembly 120 according to an embodiment of the present invention is described that the first electrode plate 122, the second electrode plate 124, and the separator 126 are wound in the jelly roll form, the present invention is not limited thereto and, according to another embodiment of the present invention, the electrode assembly may have a stack form, for example.

The first electrode plate 122 may include a first metal foil 122a and a first active material 122b. In one embodiment, the first electrode plate 122 is an anode plate, and the first metal foil 122a may be aluminum and the first active material 122b may be lithium-based oxide. However, the present invention is not limited thereto.

Further, the second electrode plate 124 may include a second metal foil 124a and a second active material 124b. In one embodiment, the second electrode plate 124 is a cathode plate, and the second metal foil 124a may be copper and the second active material 124b may be graphite. However, the present invention is not limited thereto.

The separator 126 interposed between the first, electrode plate 122 and the second electrode plate 124 may be porous polyethylene (PE) or polypropylene (PP). However, the present invention is not limited thereto. The separator 126 may further be located at an outermost position of the electrode assembly 120 to prevent or substantially prevent a short circuit from being caused between the electrode assembly 120 and the case 110 or the cap plate 150.

The first electrode plate 12, may include a first non coating portion 122c to which the first active material 122b (e.g., an active positive polar material) is not applied. The first non-coating portion 122c may protrude outward at one side of the separator 126.

The second electrode plate 124 may include a second non-coating portion 124c to which the second active material 124b (e.g., an active negative polar material) is not applied. The second non-coating portion 124c may protrude outward at the other side of the separator 126.

The first terminal portion 130 and the second terminal portion 140 are electrically connected to the electrode assembly 120.

In one embodiment, the first terminal portion 130 and the second terminal portion 140 may be symmetrical with respect to each other, and, therefore, only the first terminal portion 130 will be described herein.

The first terminal portion 130 according to an embodiment of the present invention includes a first electrode terminal 132 that passes through the cap plate 150 to protrude upward therefrom, and a first current collector 134 that is connected at one end thereof to the first electrode terminal 132 and at the other end thereof to the first electrode plate 122.

Since the first electrode terminal 132 is exposed to the outside, it may be directly connected to an external device to define a power supply path.

Further, the first current collector 134 collects a current generated from the first electrode plate 122.

In view of the characteristics of the first terminal portion 130 of collecting a current generated from the first electrode plate 122 and forming a passage for the electrical connection with an external device, in an exemplary embodiment, the first terminal portion 130 is made of a conductive material, such, as aluminum or copper. However, the present invention is not limited thereto.

According to an embodiment of the present invention, the first current collector 134 may include a first plate 1342 and a second plate 1344. The first plate 1342 is formed to be parallel to the cap plate 150 and is connected to the first electrode terminal 132. The second plate 1344 may extend below the first plate. 1342 in a vertical direction, and is connected to the first electrode plate 122.

In one embodiment, a wide surface of the second plate 1344 is in contact with the first non-coating portion 122c of the first electrode plate 122 in such a way as to be parallel thereto, and is connected to the first electrode plate 122. In one embodiment, the wide surface of the second plate 1344 may be welded to the first non-coating portion 122c of the first electrode plate 122.

As shown in FIGS. 2 and 5, the first current collector 134 according to an embodiment of the present invention may further include a third plate 1348 that connects the first plate 1342 with the second plate 1344.

In one embodiment, the third plate 1348 extends downward from the first plate 1342 in such a way as to be perpendicular thereto, and the second plate 1344 extends downward from the third plate 1348. The second plate 1344 may be on a plane that is perpendicular to a plane in which the first plate 1342 is arranged and to a plane in which the third plate 1348 is arranged.

Thus, the wide surface of the second plate 1344 may be attached to the first non-coating portion 122c of the first electrode plate 122 in such a way as to be parallel thereto.

According to an embodiment of the present invention a plurality of notches 1346 is formed in the first current collector 134.

The plurality of notches 1346 may be formed in the wide surface of the second plate 1344 of the first current collector 134 in a widthwise direction thereof. The notches 1346 may be formed along an edge of the wide surface of the second plate 1344 at intervals (e.g., predetermined intervals).

As shown in FIG. 2, the notches 1346 may be formed by cutting out portions of the edge of the wide surface of the second plate 1344. In other words, the notches 1346 may be formed by cutting out portions of a narrow surface of the second plate 1344 in a depth direction thereof.

In one embodiment, the cut shape may be a rectangular shape. However, the present invention is not limited thereto, and the cut shape may be a semi-circular shape or a triangular shape, for example, without being limited to the rectangular shape.

The notches 1346 according to an embodiment of the present invention reduce the strength of the second plate 1344 which is provided below the first plate 1342 in the vertical direction, thus allowing the second plate 1344 to absorb and mitigate external shocks.

As described above, the first current collector 134 may be made of a hard material, such as aluminum or copper, in view of its characteristics. Thus, when external shocks are applied to a secondary battery including a first current collector that does not have a plurality of notches, the first current collector may be pushed into the secondary battery without absorbing the shocks. When the first current collector is pushed into the secondary battery, particularly, a second plate of the first current collector that is in contact with a first non-coating portion of a first electrode plate of an electrode assembly to be parallel thereto may undesirably come into contact with a second electrode plate of the electrode assembly, thus leading to a short circuit and thereby causing a fire and bursting.

According to an embodiment of the present invention, the plurality of notches 1346 is formed at intervals (e.g., predetermined intervals) in the edge of the wide surface of the second plate 1344 of the first current collector 134, thus making the second plate 1344 softer, or less rigid, and thereby capable of absorbing external shocks.

For example, even if external shocks are applied to strike a side of the secondary battery 100 in a direction from an outside toward an inside, the second plate 1344 having low strength may absorb shocks in a similar manner as a spring. Even if the shocks are relatively large, the second plate 1344 may be arched in a striking direction within a proper range and may not be pushed into a region where the second electrode plate 124 is present.

In one embodiment, in order to allow the second plate 1344 to be more smoothly curved in view of the direction where the second plate 1344 is curved against the external shocks, an edge of the wide surface of the second plate 1344 having the notches 1346 is nearer to the center of the electrode, assembly 120 as compared to another edge without the notches 1346.

That is, the external shocks exerted on the secondary battery 100 are applied in the direction from the outside toward, the inside of the secondary battery 100. Thus, in order to allow the second plate 1344 to be more smoothly curved inward to conform with the direction of the external shocks, the plurality of notches 1346 is formed around an inner edge on the wide surface of the second plate 1344.

The second terminal portion 140, in one embodiment, is symmetrical with respect to the first terminal portion 130, and includes a second electrode terminal 142 and a second current collector 144. The second electrode terminal 142 passes through the cap plate 150 to protrude upward from the cap plate 150. The second current collector 144 is connected at one end thereof to the second electrode terminal 142, and at the other end thereof to the second electrode plate 124.

As the first terminal portion 130 protrudes upward from a portion of the cap plate 150 and the second terminal portion 140 protrudes upward from another portion of the cap plate 150, the first terminal portion 130 and the second terminal portion 140 are provided on an upper portion of the cap plate 150 in such away as to be spaced apart from each other by an interval and to be exposed to the outside.

Similarly to the above-described first current collector 134, the second current collector 144 may likewise include a first plate 1442 and a second plate 1444. In one embodiment, the first plate 1442 is formed to be parallel to the cap plate 150 and is connected to the second electrode terminal 142. The second plate 1444 extends below the first plate 1442 in a vertical direction and is connected to the second electrode plate 124.

In one embodiment, a third plate 1448 may be further provided, which connects the first plate 1442 with the second plate 1444 and is arranged on a plane that is perpendicular to both the first plate 1442 and the second plate 1444.

A plurality of notches 1446 may be formed in a wide surface of the second plate 1444 of the second current collector in a widthwise direction thereof. The notches 1446 may be formed along an edge of the wide surface of the second plate 1444 at intervals (e.g., predetermined intervals).

In view of the direction in which the second plate 1446 is curved by an external shock, the notches 1346 of the first current collector 134 and the notches 1446 of the second current collector 144 form a mirror-image symmetrical structure with respect to the center of the electrode assembly 120.

In one embodiment, the second terminal portion 140 is configured generally the same as the above-described first terminal portion 130 except a position at which the second electrode terminal 142 protrudes upward from the cap plate 150 and a configuration in which the second current collector 144 is connected to the second electrode plate 124 of the electrode assembly 120, and, therefore, further detailed description of the second terminal portion 140 will be omitted herein.

As described above, according to embodiments of the present invention, a secondary battery is capable of ensuring safety and reliability from external shocks.

While some exemplary embodiments have been described herein, and although specific terms are employed, they are used and are to be interpreted in a generic and descriptive sense only and not for purposes of limitation. In some instances, as would be apparent to one of ordinary skill in the art, one or more features, characteristics, and/or elements described in connection with a particular embodiment may be used singly or in combination with one or more features, characteristics, and/or elements described in connection with other embodiments unless otherwise specifically indicated. It will be understood by those of skill in the art that various changes in form and details may be made without departing from the spirit and scope of the present invention as set forth in the following claims and equivalents thereof.

What is claimed is:

1. A secondary battery comprising:
    a case;
    an electrode assembly accommodated in the case, and including a first electrode plate, a second electrode plate, and a separator between the first and second electrode plates, the first electrode plate comprising a non-coating portion at a first end of the electrode assembly, the first end being opposite a second end of the electrode assembly in a lengthwise direction;
    a first terminal portion electrically connected to the electrode assembly; and
    a cap plate configured to cover an opening of the case, wherein the first terminal portion comprises:
        a first electrode terminal passing through the cap plate to protrude in a first direction from a first position of the cap plate; and
        a first current collector comprising a first end connected to the first electrode terminal, and a second end including a plate portion connected to the first electrode plate, the first current collector including a plurality of notches in a first edge of the plate portion, the first edge being at a first side of the plate portion facing toward the second end of the electrode assembly, notches of the plurality of notches being spaced apart from one another in the first direction with a portion of the plate portion that is between the notches being in contact with the first electrode plate, wherein each of the notches extends in the lengthwise direction from the first edge to a base of the notch such that a depth in the lengthwise direction from the first edge to the base of the notch is less than a thickness in the lengthwise direction from the first edge to a second edge of the plate portion that is opposite the first edge, the first edge being between the second end of the electrode assembly and the second edge along the lengthwise direction.

2. The secondary battery of claim 1, wherein the first current collector comprises:
    a first plate connected to the first electrode terminal, and arranged parallel to the cap plate; and
    a second plate comprising the plate portion and connected to the first electrode plate, and extending away from the first plate in a second direction opposite the first direction.

3. The secondary battery of claim 2, wherein a wide surface of the second plate is in contact with the non-coating portion of the first electrode plate and arranged parallel to the non-coating portion, and is connected to the first electrode plate.

4. The secondary battery of claim 3, wherein the plurality of notches is in the wide surface of the second plate in a widthwise direction thereof.

5. The secondary battery of claim 4, wherein the first edge is a first edge of the wide surface of the second plate, and wherein the notches of the plurality of notches are at intervals along the first edge.

6. The secondary battery of claim 5, wherein each of the plurality of notches has a shape selected from the group consisting of a rectangular shape, a triangular shape, and an elliptical shape.

7. The secondary battery of claim 1, wherein the secondary battery further comprises a second terminal portion comprising:
    a second electrode terminal passing through the cap plate to protrude in the first direction from a second position of the cap plate; and
    a second current collector comprising a first end connected to the second electrode terminal, and a second end connected to the second electrode plate, the second current collector including a plurality of notches.

8. The secondary battery of claim 7, wherein the plurality of notches of the first current collector and the plurality of notches of the second current collector are arranged symmetrically with respect to a center of the electrode assembly.

9. The secondary battery of claim 7, wherein the plurality of notches of the second current collector is in a side of the second current collector facing toward the first end of the electrode assembly.

10. The secondary battery of claim 7, wherein notches of the plurality of notches of the second current collector are spaced apart from one another in the first direction.

11. The secondary battery of claim 1, wherein the second electrode plate comprises a non-coating portion at the second end of the electrode assembly.

12. A secondary battery comprising:
    a case;
    an electrode assembly accommodated in the case, and including a first electrode plate, a second electrode plate, and a separator between the first and second electrode plates, the first electrode plate comprising a non-coating portion at a first end of the electrode assembly, the first end being opposite a second end of the electrode assembly in a lengthwise direction;
    a first terminal portion electrically connected to the electrode assembly; and
    a cap plate configured to cover an opening of the case, wherein the first terminal portion comprises:
        a first electrode terminal passing through the cap plate to protrude in a first direction from a first position of the cap plate; and
        a first current collector comprising a first end connected to the first electrode terminal, and a second end connected to the first electrode plate, the first current collector including a plurality of notches in a first edge of the first current collector, the first edge being at a first side of the first current collector facing toward the second end of the electrode assembly, notches of the plurality of notches being spaced apart from one another in the first direction with a portion of the first current collector that is between the notches being in contact with the first electrode plate, wherein each of the notches extends in the lengthwise direction from the first edge to a base of the notch such that a depth in the lengthwise direction from the first edge to the base of the notch is less than a thickness in the lengthwise direction from the first edge to a second edge of the first current collector that is opposite the first edge in the lengthwise direction,
    wherein the first current collector comprises:
        a first plate connected to the first electrode terminal, and arranged parallel to the cap plate; and
        a second plate connected to the first electrode plate, and extending away from the first plate in a second direction opposite the first direction,
    wherein a wide surface of the second plate is in contact with the non-coating portion of the first electrode plate and arranged parallel to the non-coating portion, and is connected to the first electrode plate, wherein the plurality of notches is in the wide surface of the second plate in a widthwise direction thereof, wherein the first edge is a first edge of the wide surface of the second plate, and wherein the notches of the plurality of notches are at intervals along the first edge, wherein the second edge is a second edge of the wide surface of the second plate, and wherein the first edge of the second plate having the plurality of notches is nearer to the second end of the electrode assembly as compared to the second edge.

* * * * *